under this approach.

United States Patent
Patton et al.

(12) United States Patent
(10) Patent No.: US 8,284,467 B2
(45) Date of Patent: Oct. 9, 2012

(54) INTELLIGENT TONER SAVING FOR COLOR COPYING

(75) Inventors: Ronnie Neil Patton, Lake Oswego, OR (US); Ching-Wei Chang, Vancouver, WA (US); Richard John Campbell, Camas, WA (US); Lawrence Shao-hsien Chen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1143 days.

(21) Appl. No.: 11/653,714

(22) Filed: Jan. 16, 2007

(65) Prior Publication Data

US 2008/0170247 A1 Jul. 17, 2008

(51) Int. Cl.
*H04N 1/46* (2006.01)
*H04N 1/60* (2006.01)
*G06K 9/00* (2006.01)

(52) U.S. Cl. .......... 358/540; 358/1.9; 358/538; 382/165

(58) Field of Classification Search .................. 358/1.13, 358/1.14, 2.1, 1.9, 518, 521, 523, 525, 537, 358/538, 540, 462; 382/164, 165, 167
See application file for complete search history.

(56) References Cited

U.S. PATENT DOCUMENTS

| | | | | |
|---|---|---|---|---|
| 5,107,332 A * | 4/1992 | Chan | ............ | 358/518 |
| 5,579,090 A * | 11/1996 | Sasanuma et al. | ............ | 399/49 |
| 5,579,446 A | 11/1996 | Naik et al. | | |
| 5,630,026 A | 5/1997 | Ogletree et al. | | |
| 5,668,635 A * | 9/1997 | Tomida et al. | ............ | 358/296 |
| 5,684,933 A * | 11/1997 | Nagafusa | ............ | 358/1.9 |
| 5,699,172 A * | 12/1997 | Hattori et al. | ............ | 358/3.27 |
| 5,703,694 A * | 12/1997 | Ikeda et al. | ............ | 358/296 |
| 5,704,021 A | 12/1997 | Smith et al. | | |
| 5,731,823 A | 3/1998 | Miller et al. | | |
| 5,751,434 A * | 5/1998 | Narendranath et al. | ....... | 358/1.9 |
| 5,767,978 A | 6/1998 | Revankar et al. | | |
| 5,798,842 A * | 8/1998 | Yamazaki | ............ | 358/302 |
| 5,936,223 A * | 8/1999 | Suzuki et al. | ............ | 235/462.01 |
| 6,040,927 A * | 3/2000 | Winter et al. | ............ | 358/534 |
| 6,100,996 A * | 8/2000 | Amano et al. | ............ | 358/1.9 |
| 6,204,873 B1 * | 3/2001 | Shimazaki | ............ | 347/172 |
| 6,257,693 B1 * | 7/2001 | Miller et al. | ............ | 347/19 |
| 6,266,153 B1 * | 7/2001 | Davidson et al. | ............ | 358/1.9 |
| 6,313,925 B1 * | 11/2001 | Decker et al. | ............ | 358/1.9 |
| 6,324,356 B1 | 11/2001 | Inoue | | |
| 6,327,043 B1 * | 12/2001 | Rumph et al. | ............ | 358/1.15 |
| 6,456,802 B1 * | 9/2002 | Phillips | ............ | 399/27 |

(Continued)

FOREIGN PATENT DOCUMENTS

EP 0821320 A3 2/2000

*Primary Examiner* — Madelein A Nguyen
(74) *Attorney, Agent, or Firm* — Jon M. Dickinson, P.C.; Robert D. Varitz, P.C.

(57) ABSTRACT

A software-controlled method for minimizing color toner use during copying of a color page by a color copier including (a) examining such a page to identify different pre-selected categories of page-contained image elements, (b) associating, with identified different-categories of such elements, specific, respective, pre-determined color-toner usage rules, and (c) following the associating step, outputting the elements to the copier along with instructions that the copier use, in the copying of such elements, the correct, respectively associated color-toner usage rule(s). From a structural point of view, the invention includes examining structure, associating structure, and output structure designed to perform the basic core methodology steps of the invention.

3 Claims, 3 Drawing Sheets

U.S. PATENT DOCUMENTS

| | | | | |
|---|---|---|---|---|
| 6,476,836 B2* | 11/2002 | Enami | | 347/131 |
| 6,542,173 B1* | 4/2003 | Buckley | | 715/841 |
| 6,753,976 B1* | 6/2004 | Torpey et al. | | 358/1.9 |
| 6,791,714 B1* | 9/2004 | Ishimura | | 358/1.9 |
| 6,839,151 B1* | 1/2005 | Andree et al. | | 358/2.1 |
| 6,956,667 B2* | 10/2005 | Delhoune et al. | | 358/1.18 |
| 6,975,428 B1* | 12/2005 | Ernst et al. | | 358/1.9 |
| 6,987,881 B2* | 1/2006 | Nakajima et al. | | 382/173 |
| 7,039,856 B2* | 5/2006 | Peairs et al. | | 715/200 |
| 7,043,080 B1 | 5/2006 | Dolan | | |
| 7,085,005 B2* | 8/2006 | Kurose | | 358/1.9 |
| 7,259,885 B2* | 8/2007 | Kamiya | | 358/1.15 |
| 7,570,403 B2* | 8/2009 | Sawada | | 358/522 |
| 7,602,510 B2* | 10/2009 | Rombola et al. | | 358/1.14 |
| 7,693,453 B2* | 4/2010 | Kakui et al. | | 399/159 |
| 7,758,162 B2* | 7/2010 | Silverbrook | | 347/47 |
| 8,018,622 B2* | 9/2011 | Ono | | 358/2.1 |
| 8,027,062 B2* | 9/2011 | Fujita | | 358/1.9 |
| 8,040,565 B2* | 10/2011 | Shibaki et al. | | 358/2.1 |
| 8,144,365 B2* | 3/2012 | Kita et al. | | 358/1.9 |
| 2001/0015815 A1 | 8/2001 | Hada et al. | | 358/1.9 |
| 2001/0046060 A1* | 11/2001 | Kamiya | | 358/1.13 |
| 2003/0156299 A1* | 8/2003 | Martinez et al. | | 358/1.9 |
| 2003/0202693 A1* | 10/2003 | Nakajima et al. | | 382/170 |
| 2004/0061887 A1* | 4/2004 | Murashima | | 358/1.14 |
| 2004/0095587 A1* | 5/2004 | Brown et al. | | 358/1.2 |
| 2004/0125391 A1* | 7/2004 | Zuber | | 358/1.9 |
| 2004/0190029 A1* | 9/2004 | Rombola et al. | | 358/1.9 |
| 2005/0018230 A1* | 1/2005 | Green et al. | | 358/1.13 |
| 2005/0046888 A1* | 3/2005 | Tomaru | | 358/1.13 |
| 2005/0128524 A1* | 6/2005 | Liu et al. | | 358/3.06 |
| 2005/0195444 A1* | 9/2005 | Kamiya | | 358/3.24 |
| 2005/0231748 A1* | 10/2005 | Lee et al. | | 358/1.13 |
| 2005/0286083 A1* | 12/2005 | Wang et al. | | 358/3.06 |
| 2006/0055948 A1* | 3/2006 | Ozaki et al. | | 358/1.9 |
| 2006/0109491 A1* | 5/2006 | Naito et al. | | 358/1.13 |
| 2006/0181726 A1* | 8/2006 | Naito et al. | | 358/1.14 |
| 2006/0188148 A1* | 8/2006 | Nako et al. | | 382/162 |
| 2006/0228123 A1* | 10/2006 | Zaima | | 399/24 |
| 2007/0058188 A1* | 3/2007 | Nakahara | | 358/1.13 |
| 2008/0106599 A1* | 5/2008 | Liu et al. | | 348/143 |
| 2008/0107432 A1* | 5/2008 | Kamiya | | 399/27 |
| 2008/0186526 A1* | 8/2008 | Kidani et al. | | 358/1.13 |
| 2009/0034002 A1* | 2/2009 | Shibaki et al. | | 358/2.1 |
| 2009/0034026 A1* | 2/2009 | Nomura et al. | | 358/494 |

* cited by examiner

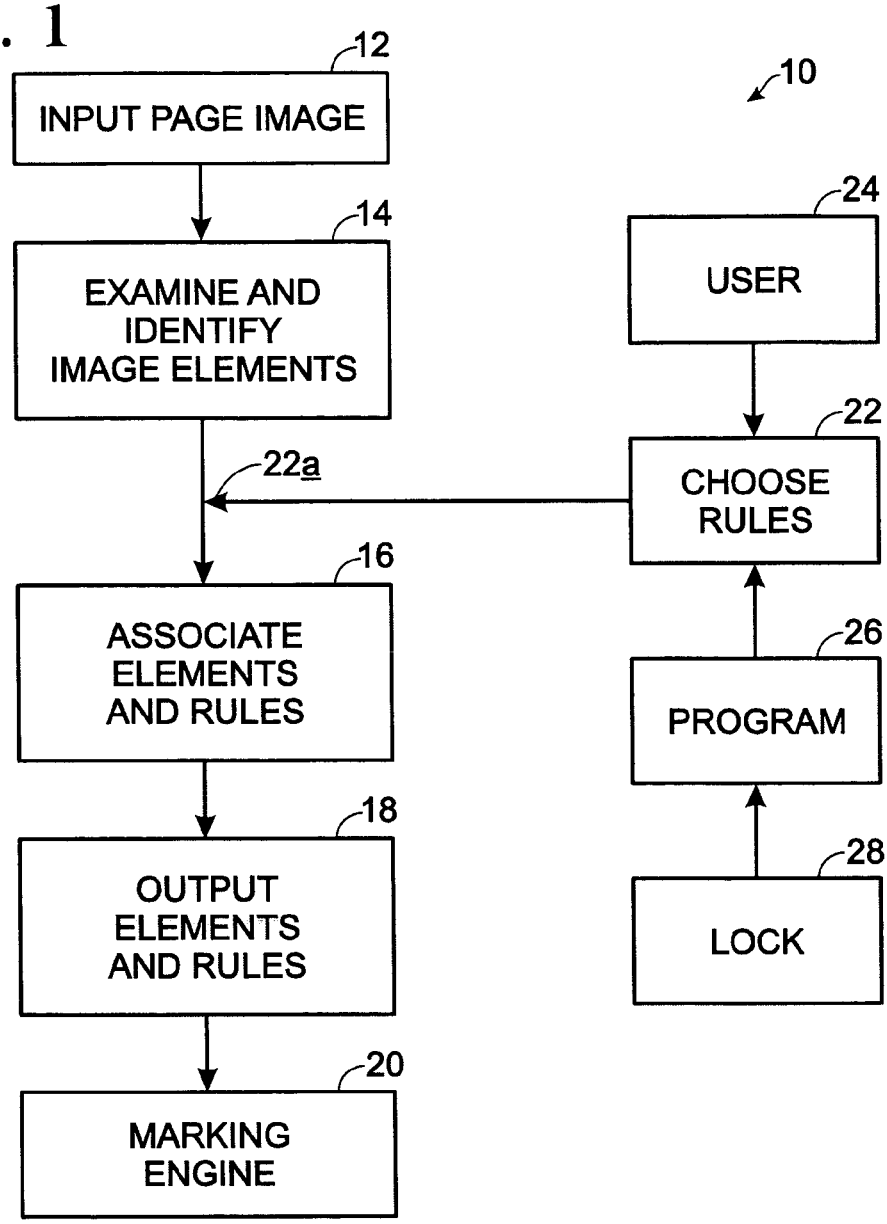
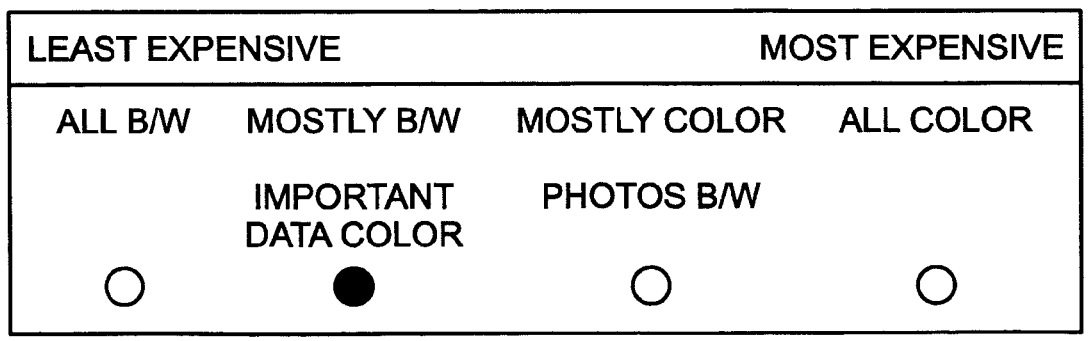

Fig. 2

| PROCESS DEFINITION | VALUES | HIGH INFORMATION | LOW INFORMATION | UNKNOWN INFORMATION |
|---|---|---|---|---|
| PAGE ELEMENTS | LARGE TEXT<br>MEDIUM TEXT<br>SMALL TEXT<br>LINE ART<br>PHOTOGRAPHS<br>LARGE SOLID COLOR AREAS<br>SMALL SOLID COLOR AREAS<br>PAGE BACKGROUND<br>LOCAL BACKGROUND<br>OTHER<br>AUTOMATIC | LARGE TEXT<br>MEDIUM TEXT<br>LINE ART | PHOTOGRAPHS<br>LARGE SOLID COLOR AREAS<br>PAGE BACKGROUND | SMALL TEXT<br>OTHER |
| OUTPUT COLOR APPEARANCE | DEFAULT<br>COLOR (SELECTABLE SATURATION)<br>BLACK (FULL BLACK)<br>GRAY (SELECTABLE SATURATION)<br>NO PRINT<br>REDACT (BLACK OUT)<br>DEFAULT<br>USER DEFINED | DEFAULT | GRAY (20%)<br>(NOTE: USER CAN SELECT PERCENTAGE) | BLACK |

INTELLIGENT TONER SAVING FOR COLOR COPYING

BACKGROUND AND SUMMARY OF THE INVENTION

This invention pertains to an intelligent, software-based system and methodology for minimizing the use of color toner during color copying.

Color copying is intrinsically more expensive than black-and-white copying. Recognizing this, many system administrators and IT managers restrict the number of pages, and the types of color originals, that may be copied. The most common means to limit color usage, and more specifically color-toner usage, takes the form of a simple directive or policy which is communicated verbally to prospective color copier users. For example, an e-mail from management, or a sign posted on a particular copier, will remind users that color copies of non-essential materials are prohibited or restricted. In the extreme, only certain users might be permitted to produce color copies in a particular color copying setting.

The most expensive component in color copying is usually the color toner or ink used to produce the desired color output. Originals, such as photographs, or presentation slides with color backgrounds, require a great deal of color toner. Therefore, these kinds of image materials are expensive to reproduce.

One method to control printing costs involves using a conventional "toner save" feature. Some printers have a similar feature. This feature is commonly seen in printer drivers under functional names such as "black-and-white-lock", "color saver", "toner save", and "draft mode". These functions frequently rely on simplistic techniques, such as printing every other pixel, and this approach usually results in very light images that are often unsatisfactory. Small, thin, or light text and lines can become unreadable.

Thus there is a need for a more intelligent approach that enables users to limit color-toner usage on a page, but which still preserves important information, such as textual and graphical information. For example, the colored background in a PowerPoint® presentation adds very little to the information content of the presentation. However, the background in such a presentation typically uses much more toner than any other page image element. In this setting, it would be very useful to permit copying of such a presentation, preserving the text and line art, but removing the extensive color-toner-usage background.

The present invention, as will be seen, proposes a software system and methodology which is useable by a color copier to reduce cost by limiting color-toner usage in different ways regarding different categories of page image elements having different information densities. As general illustrations, black toner (or no toner) could be used for page image elements, such as backgrounds and certain photographs, possessing sparse information content. Alternatively, varying amounts of color toner may be used for information-sparse page image elements. Information-dense page image elements, such as text, could be output in a clearly readable condition, but in a manner using substantially less than a "normal amount" of color toner.

In one form of practicing of the present invention, a user could manually select various software-implemented, output-processing options in a color copying situation, based upon observed page image element content categories, and by pre-deciding about appropriate levels of color-toner usage which should be related to pre-selected choices made about related categories of image-content output. For example, employing an appropriate color-copier user interface, a user could make a determination about (a) how page image elements which are characterized by dense information content should be output for copying, (b) how page image elements characterized by sparse information content should be output for copying, and (c) how page image elements of undetermined information content density should be output for copying.

These three, preferably utilized "levels" of image-element content density information characteristics, or information content, referred to herein as dense, sparse and unknown, may be determined in various ways. For example, such information content density may be determined (1) by thresholding factors, including local contrast and image entropy, (2) by object-analysis factors/natures including (a) text, (b) graph, (c) line, (d) photograph, (e) color, (f) size, (g) local contrast, and (h) layering, (3) by page classification factors, (a) page layout, (b) halftone type and frequency, (c) page background complexity, and (d) relative page percentage of various object types, including text, photographs, charts, lines, and colors, and/or (4) by utilizing conventional page-classification factors, including (a) page layout, (b) halftone type and frequency, (c) page background complexity, and (d) relative page percentage of various object types, including text, photographs, charts, lines, and colors. Such determinations may be performed in a number of different, conventional ways, and thus are not elaborated herein.

In another approach, rather than a user being offered such a manual input choice, that user could be presented effectively with a pre-established, automatically operating software control program implemented by a system administrator (referred to herein as administrator-control software), which control program has been pre-armed with color-toner usage rules that are automatically applied with respect to different pre-selected categories of page image elements. Such elements could be identified automatically, for example, by an appropriate, conventional, software-controlled page-scanning operation, and then "reviewed" by the use of also conventional page-element characterization software. The automatically operating software control program of this invention could enforce administrator-applied (administrator-control) corporate polices on user, group, and/or organization levels. Toner-usage rules could be selectively applied using authentication methods, user login, smart cards, biometrics and/or other methods common in the art.

Additionally, in certain forms of "administrator-control", or "administrator pre-control", cases, it is possible, and it may be desirable, under an established toner-usage policy which has been set forth by the administrator, to allow certain users/groups/organization-levels a particular sub-range, or selection, of toner-usage choices which are outside of strict administrator control. For example, upon user authentication, a selected user could be presented, as by information provided on a suitable user interface, with a defined range of toner-usage choices, with notification also effectively being simultaneously provided to the user indicating that certain toner-usage options are prohibited by the current toner-usage policy. As a illustration, options which are prohibited by that policy may be disabled (grayed-out) or simply not presented to the particular user.

These and other ways of intelligently managing and minimizing the usage of color toner form the focus of the present invention. The invention thus effectively implements a software methodology, in association with appropriate implementing structure, to enable either a user, or a pre-determined software control program, to select and apply appropriate pre-selected color-toner usage rules that become employed in a final output copying operation, based upon a linking of these rules with the results of a pre-examination of a particular color-page's content of different-information-density image elements. The features of the invention, such as those just generally suggested above, and its advantages, will now become more fully apparent as the detailed description which follows is read in conjunction with the accompanying drawings.

DESCRIPTION OF THE DRAWINGS

FIG. 1 is a block/schematic diagram which illustrates both the unique methodology, and the associated structure for implementing that methodology, of the present invention with respect to the intelligent saving of color toner in a color-copying environment.

FIG. 2 presents a toner-usage matrix that outlines one illustrated toner-saving approach, in accordance with practice of the present invention, and describing how to apply different pre-selected color-toner usage rules in relation to different, identified, pre-selected categories of image elements which form part of the content of a color page which is presented for copying.

FIG. 3 pictures a representative color-copier user interface which enables direct user manual inputting of toner-usage instructions.

DETAILED DESCRIPTION OF THE INVENTION

Figure 4:
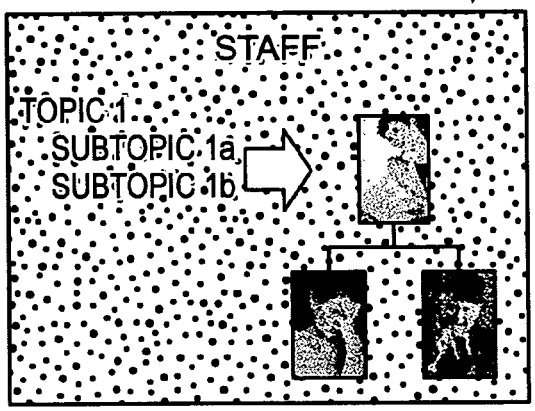
FIG. 4 illustrates a representative color page having a relatively wide variety of different, illustrative page image elements to which color-toner usage rules are to be applied in accordance with practice of the present invention.

Turning attention now to the drawings, and referring first of all to FIG. 1, indicated generally at 10 is a block/schematic diagram which fully illustrates both the system and the methodology of the present invention. In point of fact, this figure, when read in conjunction with descriptive material which now follows regarding the system and methodology of the invention, presents these two, principal aspects of the invention in a fashion which will fully enable someone generally skilled in the relevant art to practice this invention.

In particular, FIG. 1 illustrates nine, interconnected, word-labeled blocks 12, 14, 16, 18, 20, 22, 24, 26, 28. Arrowheads which appear on lines that interconnect these blocks in different ways generally illustrate the flow of information and control which takes place in the system and methodology illustrated in FIG. 1.

Implementation and practice of the present invention essentially begins with the pre-selecting of different categories of image elements, or objects, which are expected to appear on color pages presented for copying. These elements are preferably pre-chosen on the basis of different image content density information characteristics, and an excellent practice has been found to involve a choice of three different levels of information density, referred to herein (as mentioned briefly above) as (a) dense, (b) sparse, and (c) unknown. These levels may be determined in many different manners, as generally suggested earlier herein, including (1) using thresholding factors, such as local contrast and image entropy, (2) employing object-analysis factors and natures, such as text, graph, line, photograph, color, size, local contrast, and layering, (3) focusing on page classification factors, such as (a) page layout, (b) halftone type and frequency, (c) page background complexity, and (d) relative page percentage of various object types, including text, photographs, charts, lines, and colors, and/or (4) utilizing conventionally understood page-classification factors, including (a) page layout, (b) halftone type and frequency, (c) page background complexity, and (d) relative page percentage of various object types, including text, photographs, charts, lines, and colors.

The invention also recognizes that a particular type of page image element, or object, may not always carry the same kind of information density, depending on the type (classification) of page it is on, or what other page objects are present. Therefore, page-classification factors may also be considered to be page image elements within the contemplation of the present invention, and be considered to be important in determining information density, and how to employ that "density" concept. For example, page background color may be elected to be dropped in a PowerPoint® presentation document page, whereas background color used to highlight a paragraph in a particular business document may be elected to be preserved.

Conventional, specific "ways" of implementing these characterizing factors, including ways of employing page-classification factors as relevant page image elements, are well known in the art, form no particular part of the present invention, and thus are not discussed in detail herein.

It is with respect to these identified, pre-selected information density characteristics that what are referred to herein as color-toner usage rules are established to define how toner will be employed during color copying to deal, respectively, with each of these categorical characteristics.

It should be understood that while a particular, illustrative hierarchy of image content density characteristics is specifically presented and described herein, this hierarchy, or "plan", for the establishment of toner-usage rules is intended to be illustrative only, and not in any sense limiting with respect to the granularity of image content density characteristics which may freely be chosen by one determined to implement and practice the present invention. It is the use of differentiated image content information density which furnishes central power to the intelligent and efficient use of color toner in the practice of the present invention during color copying.

FIG. 2 in the drawings illustrates a representative, color-toner-usage "control" matrix 30 which describes one way of implementing the practice of the present invention. Reference to this FIG. 2 matrix will immediately inform those skilled in the relevant art not only how this specific matrix 30 establishes a workable set of page image element features to which toner usage rules may be assigned, but also clearly indicates a representative pattern which can act as an instructional basis to those generally skilled in the art for establishing other patterns and matrices for the application of color-toner-usage rules.

Returning attention now to FIG. 1, it is essentially block 22 in that figure, labeled "CHOOSE RULES", which operates in relation to the formation and ultimate use (see arrowhead 22a) of a toner-usage matrix, such as the one which has just been described with respect to FIG. 2. In FIG. 1, block 24, labeled "USER", represents a system and methodology condition wherein a user is enabled manually to choose a toner-usage matrix architecture, and thereby establish an appropriate set of toner-usage rules that are to be employed with respect to different kinds of color page image elements. Such "user enablement" might typically be offered in a situation where a color copier has not been programmed with a predetermined toner-usage matrix. Regarding manual user entry of toner-usage control information, FIG. 3 illustrates a typical color-copier user interface by way of which a user might choose and assign certain toner-usage rules with respect to a particular color page which is to be presented for color copying. Other styles and kinds of such an interface, such as a control slider interface, may also be employed as desired.

Block 26 in FIG. 1, labeled "PROGRAM", represents a system and methodology condition wherein someone, such as a system administrator, may establish an operative matrix, such as matrix 30, which is programmed and then controlled by a suitable software program installed in a color copier. Thus, whereas block 24 represents the opportunity for an individual user manually to establish toner-usage matrix architecture, and/or to determine user or group ID, block 26 represents the condition where user selection is not permitted, or is overridden, and where automatically operative, pre-programming, as generally outlined earlier herein, is what controls such architecture. There are, of course, many conventional ways in which block 26 may be configured to implement various forms of administrator control, and, accordingly, details of this block are not elaborated herein.

Block 28 in FIG. 1, labeled "LOCK", represents the option for someone in authority, again probably a system administrator, not only to choose a fully software-controlled, and software-controlling, pre-determined toner-usage matrix, but also to lock that matrix against the possibility of third party tampering or changing.

Taking a somewhat more specific look at toner-usage matrix 30 as shown in FIG. 2, and referring just to several of the there-labeled page image elements which are referred to in FIG. 2 as "Values", one can see that Large Text and Medium Text have been characterized as possessing high, or dense, information content, Photographs and Page Background have been categorized as possessing low, or sparse, information content, and Small Text has been characterized as possessing unknown-density information content. It is on the bases of these information density characterizations that a functional color-copying division between these several, different page image elements has been made which will cause respectively different toner-usage rules to be applied to each of them in the three different image density characteristics of dense, sparse and unknown.

As is shown in the matrix of FIG. 2, high (dense) information content elements (Large Text, Medium Text, and Line Art) are to be output in full color (Default). Elements with low (sparse) information density (Photographic, Large Solid Color Areas and Page Background) will be output at 20% gray scale. Areas of unknown information density (Small Text, and Other) will be printed in full black. Some elements may not be printed at all (No Print).

Reference in the column in FIG. 2 to the page image element category generally identified as "Other" may apply to selected page characteristics, such as the background-color, text-highlighting characteristic referred to above. Also, this column in FIG. 2, or any other appropriate column in this figure, could, instead of (or in addition to) listing the general category "Other", specifically list particular page characteristics of interest, e.g., "background highlighting".

It is in this manner that selected page image elements become ultimately assigned, in one way or another, and as suggested earlier herein, for treatment in accordance with the application of different toner-usage rules. And, it is this special behavior of the present invention that which results in intelligent toner saving during color copying, in accordance with practice of the invention.

Recognizing that the four vertically arranged blocks 22, 24, 26, 28 which appear on the right side in FIG. 1 effectively describe several different ways in which the toner-usage rules become assigned for use in conjunction with different-character page image elements, typical practice of the present invention will now be described with and in conjunction with the five other blocks shown in FIG. 1.

When a color page is presented for copying (block 12 labeled "INPUT PAGE IMAGE"), that page, in any suitable and conventional manner, is examined to identify different categories of the respective page image elements (block 14 labeled "EXAMINE AND IDENTIFY IMAGE ELEMENTS"). With this determination made, the identified image elements, in accordance with practice of the invention, are respectively associated with their appropriate toner-usage rules (block 22, arrowhead 22a, and block 16 which is labeled "ASSOCIATE ELEMENTS AND RULES"), and these page image elements are then output (block 18 labeled "OUTPUT ELEMENTS AND RULES") to the marking engine (block 20 labeled "MARKING ENGINE") in the relevant color copier. That marking engine is then effectively instructed to apply the respective toner usage rules to the different, identified page image elements, with the result that an output copied/printed page will be generated in a manner characterized by the intelligent saving of color toner.

This very general description of the operation of the invention is fully applicable to all color-page copying behavior undertaken in a color copier that is operating utilizing the features of the present invention.

Figure 5:
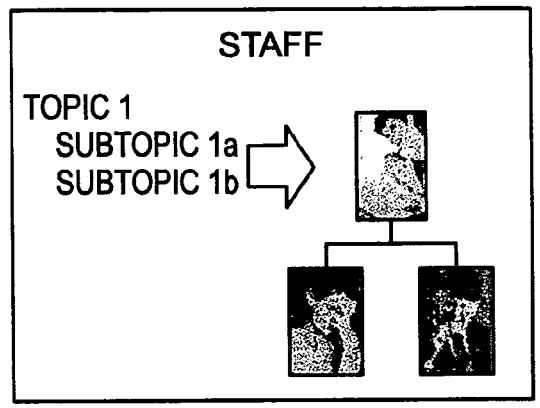
FIG. 5 illustrates the same page of information shown in FIG. 4 after output copying has been performed in the context of the application of color-toner-saving usage rules variously to the different page image elements which are present in the page shown in FIG. 4.
Figure 6:
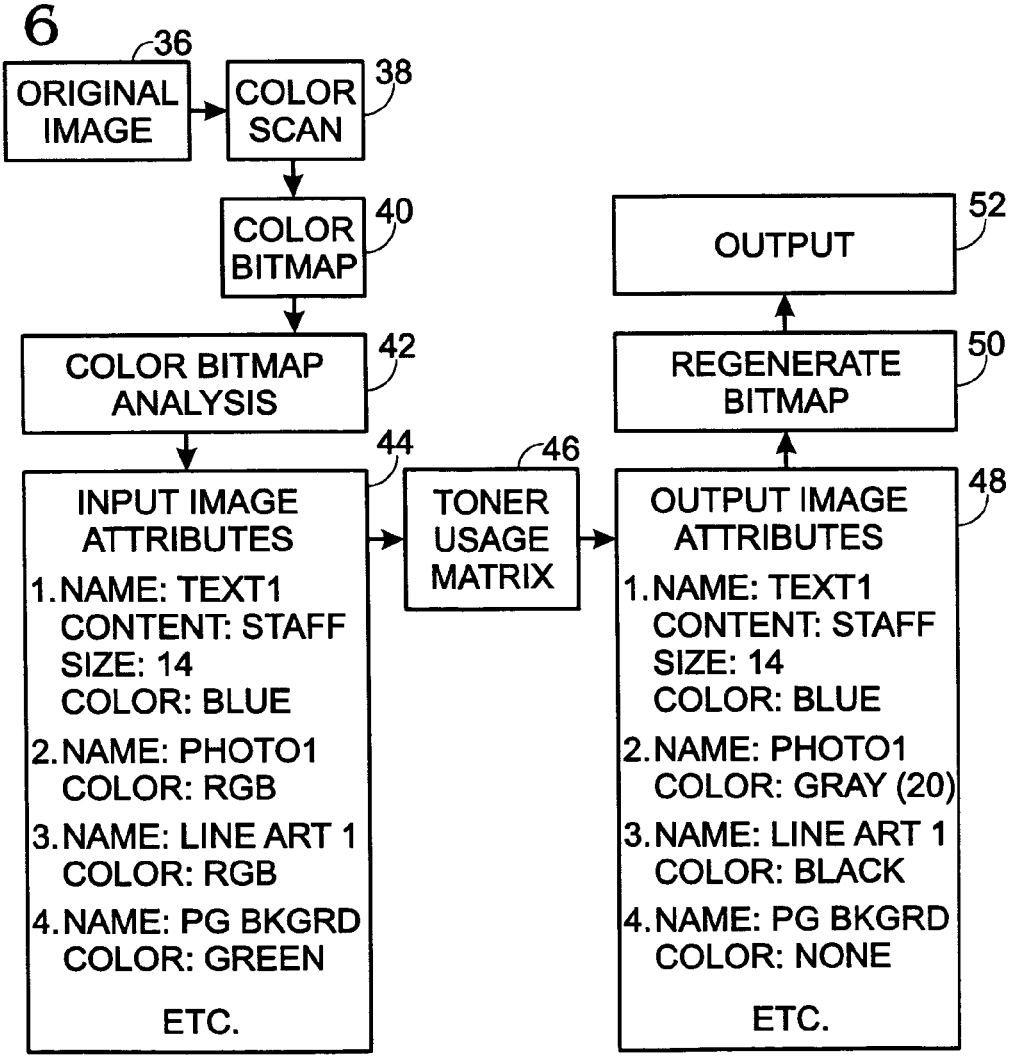
FIG. 6 is a block/schematic diagram which largely self-explains the operation of the invention as it relates to the color page contents pictured in FIGS. 4 and 5.

A very specific detailed illustration of the operation of the present invention is provided by the combination of FIGS. 4, 5 and 6 in the drawings.

FIG. 4 illustrates a pre-copied color page 32 which possesses a number of different-category image elements, including text, photographs, line art, and background color.

FIG. 5 illustrates an output color copy 34 of the page shown in FIG. 4 following implementation of one form of the present invention with respect to which certain toner-usage rules have been selected and applied.

FIG. 6, which includes a number of interconnected, internally labeled blocks 36-52, inclusive, provides a very self-explanatory disclosure of how the page which is presented in FIG. 4 for color copying is ultimately output as the copied, toner-saved page pictured in FIG. 5.

For example, initial viewing and analysis (blocks 36, 38, 40, 42) of the color page (32) presented for the purpose of identifying different categories of page image elements, has resulted in the identification of at least four different-category elements, referred to in FIG. 6, block 44, as "Text 1", "Photo 1", "Line Art 1", and Page Background, identified as "Pg Bkgnd". These several page image elements identified in block 44 are linked via an appropriate toner-usage matrix 46 to respectively associated toner-usage rules in block 48, and are output via blocks 50, 52 to a color-copier marking engine for the printing of page 34 as seen in FIG. 5.

It will thus be apparent that a unique methodology, and a systemic organization for implementing that methodology, have been illustrated and described herein for making intelligent use of color toner in a color copying operation. Pages presented for color copying in the context of implementation and practice of the present invention may be characterized with a very wide variety of freely selectable page-image elements, with these elements then being linked with freely chooseable toner-usage rules aimed at implementing intelligent color-copying with significant toner saving.

It will also be very apparent that the interconnected blocks shown in FIG. 1 may be read, from one point of view, and as has just above been described, to illustrate the methodology of the present invention, and from another point of view, to illustrate also the systemic structure of the invention.

From a broadly-stated methodologic point of view, the invention can be described as being a software-controlled method (10 in FIG. 1) for minimizing color toner use during copying of a color-page by a color copier. This method includes the steps of (a) examining such a page to identify different, pre-copying, selected categories of page-contained image elements (block 12, 14 in FIG. 1), (b) thereafter associating, with identified different-category elements, specific, respective, pre-determined color-toner usage rules (blocks 16, 22, and arrowhead 22a in FIG. 1), and (c) following the step of associating, outputting the elements to the copier (block 18 in FIG. 1) along with instructions that the copier use, in the copying of such elements, the correct, respectively associated color-toner usage rule(s).

The method of the invention further includes, generally speaking, pre-selecting the different categories of image elements on the basis of respectively related, pre-chosen, image content information density characteristics of such elements, and establishing specific color-toner usage rules which are to be associated with such different element categories.

While various conventional software approaches may be employed to achieve information density characterization of image elements including classifications, of pages (as suggested earlier), certain kinds of such elements might be specially user-designated regarding information density levels by manual user highlighting of these elements via traditional color transparency markers. For example, the color blue could be used to indicate a low density condition, the color pink to indicate a high density condition, and the color yellow to indicate an unknown density condition.

From a broad structural and systemic point of view, the invention may be viewed as being software-controlled apparatus (10 in FIG. 1) for minimizing color toner usage during color-page copying by a color copier including (a) examining structure (block 14 in FIG. 1) for examining a color page to identify different pre-copying selected categories of page-contained image elements, (b) associating structure (block 16 in FIG. 1) operatively connected to the examining structure for associating, with identified, different-category image elements, specific, respective, pre-determined color-toner usage rules, and (c) output structure (block 18 in FIG. 1) operatively connected to the associating structure for outputting the image elements to a copier along with instructions that the copier use, in the copying of the elements, the correct, respectively associated color-toner usage rule(s).

Accordingly, while preferred and best-mode embodiments of, and manners of practicing, the present invention, have been illustrated and described herein, it is appreciated that variations and modifications may be made without departing from the spirit of the invention.

We claim:

1. A software-controlled method for minimizing the usage of color toner by a color copier during copying of a color page which includes color-image elements comprising
    examining the color page to identify included color-image elements,
    as a part of said examining, determining the level of the information-density characteristic of each of the color page's identified color-image elements as being one of (a) dense, (b) sparse, and (c) unknown,
    associating with each identified color-image element, in relation to the level of its determined information-density characteristic, a specific, pre-determined, color-toner usage rule which is associated with the overall normal amount of color toner to be used, and
    following said associating, outputting the color page's color-image elements to the copier along with instructions that the copier use, in the copying of such elements, the correct, respectively associated color-toner usage rules(s) regarding the overall normal amount-of-toner-to-be-used.

2. The method of claim 1, wherein the levels of information density characteristics are determined utilizing at least one of certain thresholding factors including (a) local contrast, and (b) image entropy.

3. The method of claim 1, wherein the levels of information density characteristics are determined utilizing image-element object-analysis factors and natures including (a) text, (b) graph, (c) line, (d) photograph, (e) color, (f) size, (g) local contrast, and (h) layering.

* * * * *